United States Patent [19]
Geppert et al.

[11] Patent Number: 4,783,029
[45] Date of Patent: Nov. 8, 1988

[54] PIPE CLAMP

[75] Inventors: Helmut Geppert, Karlstein; Kurt Strauss, Karben, both of Fed. Rep. of Germany

[73] Assignee: Rasmussen GmbH, Maintal, Fed. Rep. of Germany

[21] Appl. No.: 31,257

[22] Filed: Mar. 26, 1987

[30] Foreign Application Priority Data

Apr. 5, 1986 [DE] Fed. Rep. of Germany ....... 3611534

[51] Int. Cl.$^4$ .............................................. F16L 3/08
[52] U.S. Cl. .................... 248/74.1; 24/542; 24/459; 248/65; 248/73; 403/13; 403/344
[58] Field of Search ..................... 248/74.1, 74.2, 68.1, 248/316.1, 316.2, 73, 62, 65, 67.7; 24/542, 549; 403/344, 13

[56] References Cited

U.S. PATENT DOCUMENTS

| | | | |
|---|---|---|---|
| 2,497,820 | 2/1950 | Kielland | 248/68.1 X |
| 2,923,509 | 2/1960 | Kolodin | 248/62 |
| 3,462,804 | 8/1969 | Renaudin | 248/74.4 |
| 4,143,844 | 3/1979 | Van Meter | 248/62 |
| 4,146,203 | 3/1979 | Williams | 248/62 |
| 4,251,844 | 2/1981 | Horstmann | 248/74.1 X |

FOREIGN PATENT DOCUMENTS

| | | | |
|---|---|---|---|
| 3019303 | 11/1981 | Fed. Rep. of Germany | 248/74.2 |
| 8402839 | 1/1984 | Fed. Rep. of Germany | |
| 1559036 | 3/1969 | France | |
| 0058118 | 5/1977 | Japan | 248/DIG. 1 |

Primary Examiner—Ramon O. Ramirez
Attorney, Agent, or Firm—Peter K. Kontler

[57] ABSTRACT

A pipe clamp wherein a C-shaped elastic holder cooperates with a U-shaped confining member to define a space which can receive a pipe with at least some radial play. The end portions of the holder are biased away from each other by an arcuate intermediate portion which extends along an arc of more than 180 degrees, and the end portions of the holder have openings for reception of inwardly bent lugs on the legs of the U-shaped confining member. The end portions are further formed with ramps which guide the lugs toward and into the respective openings when the confining member is in the process of being affixed to the holder. The end portions of the holder move apart as soon as the lugs move into register with the respective openings whereby the lugs are compelled to enter the openings to thereby couple the confining member to the holder. The latter has two corrugations which are adjacent the respective legs and are spaced apart from each other by a distance less than the diameter of the pipe in the space between the holder and the confining member.

19 Claims, 3 Drawing Sheets

PIPE CLAMP

BACKGROUND OF THE INVENTION

The invention relates to improvements in clamps for pipes and similar cylindrical objects. More particularly, the invention relates to improvements in clamps of the type wherein the pipe is confined between a substantially C-shaped holder and a substantially U-shaped confining member and the legs of the U-shaped confining member cooperate with the end portions of the C-shaped holder to releasably hold the pipe between them.

It is already known to construct the holder of a pipe clamp in such a way that it extends along an arc of more than 180 degrees and that its end portions are disposed between the legs of the confining member. The holder and/or the confining member is elastic so that the end portions of the holder are biased against the respective legs or vice versa to ensure that the mating male and female detent means on the legs and on the end portions are held against accidental separation or against separation in response to the application of relatively small deforming forces.

In accordance with a presently known proposal, the clamp is made of a plastic material and the end portions of the holder bear against the external surface of the confined pipe. This creates problems, especially if the pipe is supported by two or more spaced-apart clamps. Thus, if the pipe tends to expand radially as a result of heating or to expand or contract longitudinally as a result of heating or cooling and/or if the pipe is shifted axially, it tends to buckle or bend between neighboring clamps and/or to detach the clamps from their carriers and/or to disengage the confining members from the holders of the clamps.

German Utility Model No. G 84 02 839 to Degussa discloses a clamp wherein the holder and the confining member comprise end portions and legs which cooperate to urge the holder against the confined pipe. The end portions and the legs constitute wedges and the legs of the confining member are forced over the end portions of the holder. This publication specifically points out that the confining member cooperates with the holder to ensure a reliable and pronounced retention and confinement of the pipe.

French Pat. No. 1,559,036 to Dom discloses a clamp wherein the holder and the confining member cooperate to forcibly confine the pipe between them. To this end, such parts are made of an elastic material and are dimensioned in such a way that they bear upon the external surface of the pipe. Reference may be had to the left-hand column on page 1 and to the resume of the patent.

OBJECTS AND SUMMARY OF THE INVENTION

An object of the invention is to provide a pipe clamp which is constructed and assembled in such a way that the pipe is less likely to be released than in heretofore known clamps.

Another object of the invention is to provide a pipe clamp which can support a pipe in such a way that the pipe is not likely to buckle and/or separate the clamp from its carrier.

A further object of the invention is to provide a novel and improved holder and a novel and improved confining member for use in the above outlined clamp.

An additional object of the invention is to provide a simple and inexpensive pipe clamp which can be mass-produced from simple blanks in available machines.

Still another object of the invention is to provide a novel and improved method of making a pipe clamp from metallic sheet material.

An additional object of the invention is to provide novel and improved means for facilitating engagement of the holder of the above outlined pipe clamp with the confining member.

The invention resides in the provision of a clamp for pipes, conduits or rods (hereinafter called pipes) having a predetermined outer diameter. The improved clamp comprises a substantially C-shaped resilient holder including an arcuate intermediate portion and first and second end portions, and a substantially U-shaped confining or retaining member which is separably attached to the holder and includes a web and first and second legs flanking the web. The first and second legs are outwardly adjacent the first and second end portions of the holder, respectively, and the legs as well as the respective end portions have cooperating male and female detent means which separably maintain the legs in engagement with the respective end portions. The intermediate portion of the holder stores energy in a sense to move the end portions apart so that the end portions are biased toward or against the respective legs in order to maintain the male detent means in engagement with the respective female detent means. The confining member and the holder define a space (which may but need not be exactly circular) such that a pipe having the predetermined diameter is receivable in the space with at least some radial play which suffices to ensure that the clamp will not prevent axial movements of the pipe relative to the holder and confining member in response to thermally induced or otherwise initiated radial and/or axial expansion or shifting of the confined pipe. This effectively reduces and practically eliminates the likelihood of bending or buckling of the pipe and/or separation of the clamp from its carrier, e.g., a wall, a beam, a bracket or the like.

The holder extends along an arc of more than 180 degrees. In accordance with a presently preferred embodiment, the male detent means are provided on the legs of the confining member and the female detent means are provided on or in the end portions of the holder. At least the holder preferably consists of a metallic sheet material, e.g., spring steel. In order to simplify the making of the confining member and to reduce the cost of the improved clamp, the male detent means can include simple lugs which are provided on and form integral parts of the legs of the confining member. Such lugs can be said to constitute projections which extend toward the respective end portions of the holder; the end portions have recesses (e.g., in the form of polygonal holes or openings) which constitute the female detent means and receive the respective projections or lugs. Each leg can be provided with several projections which preferably form a row extending in substantial parallelism with the axis of the confined pipe. The end portions of the holder can be provided with sloping ramps along which the respective projections slide on their way toward penetration into the respective recesses during assembly of the confining member with the holder. The ramps can constitute suitably inclined tongues which are bent from the general planes of the respective end portions. Each such end portion is preferably further provided with guide means flanking the respective ramp and serving to guide the projections of the associated leg on their way toward and into the respective recesses during attachment of the confining member to the holder. To this end, each end portion can be formed with two open-ended slits which extend in the circumferential direction of the holder, and the ramps are disposed between the slits in the respective end portions. Thus, the ramps constitute inwardly bent parts of the end portions and the slits in each end portion are preferably parallel to each other.

The legs of the confining member can be provided with slits which extend to their end faces, and the male detent means can include bent-over lug-shaped projections of the legs; each such projection is flanked by two slits in the respective leg. Such mode of making the projections contributes to lower cost of the confining member.

Each end portion of the holder is preferably formed with an inwardly extending corrugation which is adjacent the respective leg in assembled condition of the clamp. The corrugations are spaced apart from each other by a distance which is at least slightly less than the predetermined diameter. The intermediate portion of the holder which is formed with such corrugations preferably extends along an arc of at least 180 degrees. Those ends of the intermediate portion which are adjacent the corrugations are preferably spaced apart from one another by a distance which exceeds the predetermined diameter.

The web of the confining member is or can be flat and straight.

If desired, the legs of the confining member can be provided with terminal portions which extend beyond the respective detent means and slope outwardly away from each other. This facilitates the assembly of such confining member with the holder.

At least one support (e.g., a foot) can be affixed (for example, spot welded) to the intermediate portion of the holder and/or to the web of the confining member.

In order to simplify the making of the holder and of the confining member, each of these parts preferably consists of two integral halves which are mirror symmetrical to each other with reference to a plane including the axis of the pipe in the aforementioned space. Such design simplifies the assembly of the confining member with the holder because it is immaterial which leg of the confining member is first to be attached to the respective end portion of the holder.

The novel features which are considered as characteristic of the invention are set forth in particular in the appended claims. The improved pipe clamp itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 4:
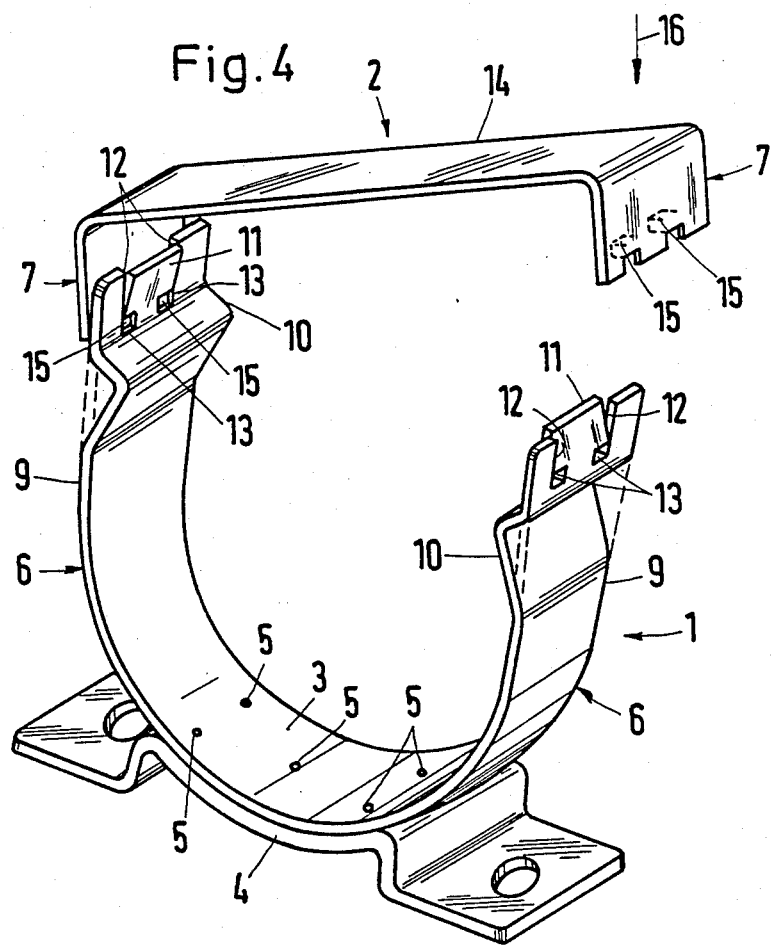
FIG. 4 is a smaller-scale perspective view of the clamp with the confining member partially detached from the holder and further showing a supporting foot which is welded to the intermediate portion of the holder.

The pipe clamp which is shown in FIGS. 1 to 4 comprises a substantially C-shaped holder 1 of resilient metallic sheet material and a substantially U-shaped confining member 2 which can be made of the same material as the holder. FIG. 4 shows that the arcuate yoke-like intermediate portion 3 of the holder 1 is spot welded (at 5) to a support in the form of a foot 4 which can be affixed to a wall or to any other structure serving to carry the weight of a pipe 8 (indicated in FIG. 1 by a phantom-line circle). The illustrated foot 4 can be replaced by any other suitable support, e.g., by a loop, fishplate, threaded rod, T-iron or the like, without departing from the spirit of the invention. The selection of a support for the holder 1 will depend on the dimensions and the nature of the structure which is to carry the weight of the clamp and of the pipe 8; the structure can include a bottom wall, a sidewall, a top wall, a beam, another pipe or any other structure which is used in a building or elsewhere to support pipes forming part of a plumbing system, a sanitary installation, a pipeline, conduits or sheaths for electrical conductors, cables or the like.

For example, the holder 1 and the confining member 2 can be made of sheet steel stock such as St3K40 or a chromium nickel steel which exhibits the requisite amount of elasticity to ensure that the end portions 6 of the holder 1 and the legs 7 of the confining member 2 are biased in predetermined directions and to predetermined positions relative to each other.

Figure 1:
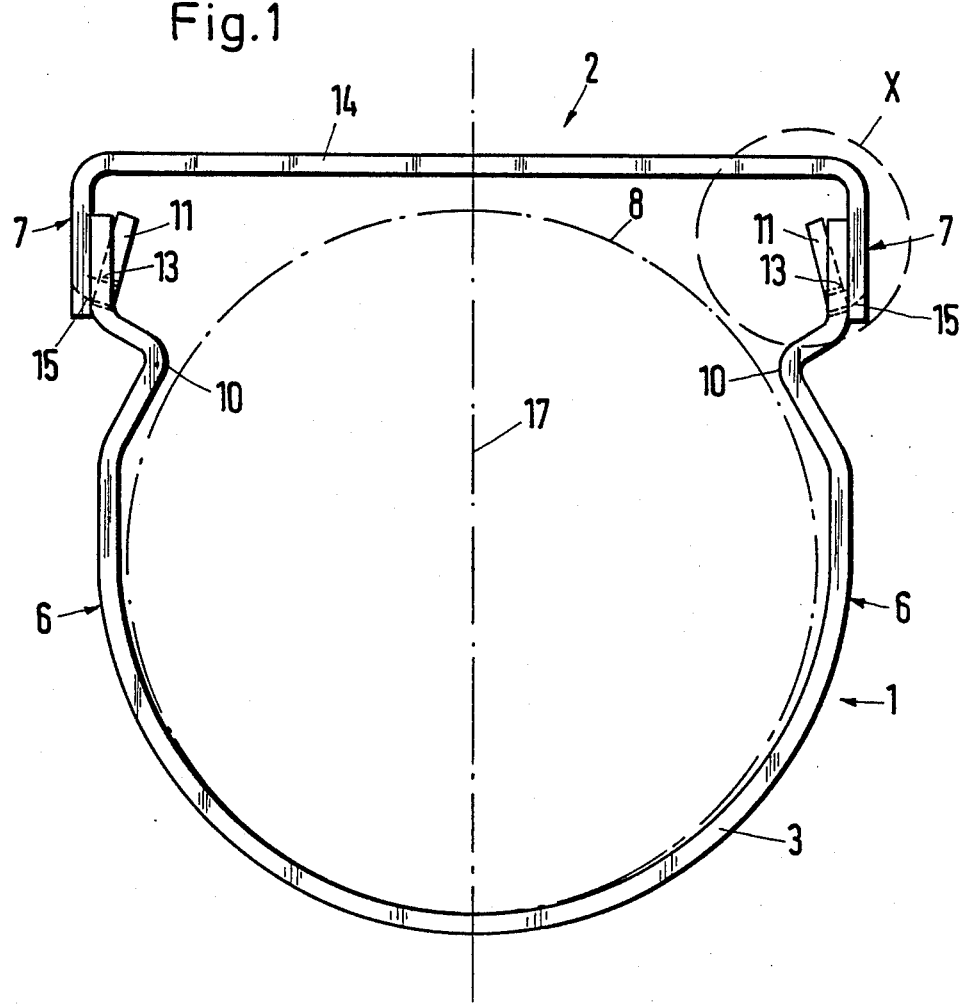
FIG. 1 is an elevational view of an assembled pipe clamp which embodies one form of the invention, the pipe within the confines of the clamp being indicated by a phantom-line circle.
Figure 2:
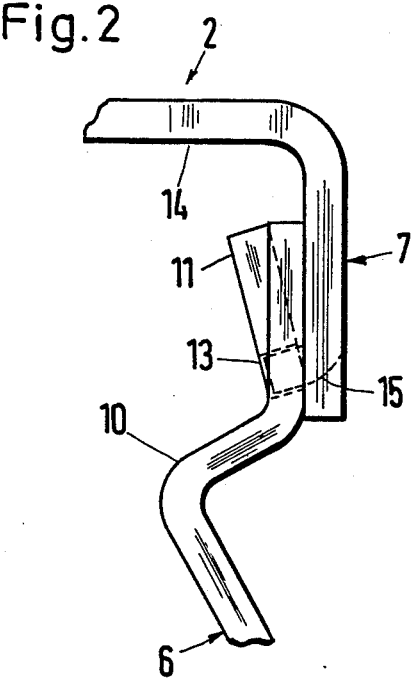
FIG. 2 is an enlarged view of a detail within the phantom-line circle X in FIG. 1.
Figure 3:
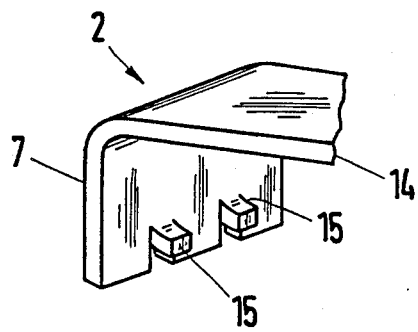
FIG. 3 is an enlarged fragmentary perspective view of the left-hand portion of the confining member in the clamp of FIG. 1.

When the holder 1 is properly assembled with the confining member 2 in a manner as shown in FIG. 1, these parts define a space which is large enough to receive the pipe 8 with at least some radial play. This ensures that the pipe does not exhibit a tendency to bend or buckle between two spaced-apart clamps and/or that the clamps do not tend to become separated from their supports (such as the feet 4) and/or that the supports do not tend to become separated from their carrier in response to thermally induced radial expansion and/or lengthening of the pipe. In other words, it is preferred to dimension the parts 1 and 2 of the improved clamp in such a way that the pipe 8 is invariably confined with freedom of axial movement relative to the holder 1 and confining member 2.

As shown in FIG. 4, the axially parallel end faces of the end portions 6 of the holder 1 are formed with pairs of circumferentially extending slits 12 which flank sloping ramps 11 and are bounded by parallel guide members for male detent members or projections 15 on the legs 7 of the confining member 2. The ramps 11 constitute inwardly bent tongues of the respective end portions 6, and the inner ends of the slits 12 communicate with substantially rectangular recesses 13 in the form of openings or holes which extend all the way through the respective end portions 6 to receive the male detent members or projections 15 of the respective legs 7. The slope of the ramps 11 between the pairs of slots 12 need not be very pronounced because the end portions 6 can be moved toward each other by deforming the arcuate intermediate portion 3 of the holder 1 so that, once the projections 15 are introduced into the openings or recesses 13 of one end portion 6, the other end portion 6 is bent toward the one end portion until the tips of the projections 15 can engage the outer side of the ramp 11 on the other end portion 6 whereupon the respective leg 7 is pushed downwardly (see the arrow 16 in FIG. 4) to cause its projections 15 to slide along the outer side of the adjacent ramp 11 and to penetrate into the respective openings 13. At such time, the intermediate portion 3 (which stores energy) causes the right-hand end portion 6 of FIG. 4 to move away from the left-hand end portion 6 and to thus ensure that each pair of projections 15 is reliably held in the corresponding pair of openings 13.

The projections 15 are formed by providing each leg 7 with two pairs of slits extending upwardly from its edge face and by bending inwardly those portions of the respective leg which are disposed between a pair of neighboring slits. This can be readily seen in FIG. 3. The median portion or web 14 of the confining member 2 is or can be flat and straight, and the legs 7 preferably extend at right angles to such web. The number of projections (male detent members) 15 on each leg 7 can be reduced to one or increased to three or more, depending on the width of the strip stock from which the confining member 2 is made. The width of the confining member 2 may but need not match the width of the holder 1.

FIGS. 1 and 4 further show that the end portions 6 of the holder 1 are formed with corrugations 10 which are adjacent the ends 9 of the intermediate portion 3. The minimum distance between the corrugations 10 (when the holder 1 is assembled with the confining member 2) is less than the outer diameter of the pipe 8, and the length of the arcuate intermediate portion 3 between its ends 9 is more than 180 degrees. This can be readily seen in FIG. 1. Thus, when the pipe 8 assumes the position of FIG. 1 by having moved relative to the holder 1 or vice versa, the innermost portions of the corrugations 10 are forced apart to thereupon immediately move toward each other because the intermediate portion 3 is free to dissipate energy. The end portions 6 are coupled to the respective legs 7 in the next following step.

The end portions 6 of the holder 1 are originally flat (this is shown in FIG. 4 by broken lines), and the corrugations 10 are provided in the innermost portions of such flat end portions adjacent the ends 9 of the intermediate portion 3. One and the same set of corrugating tools or other suitable instrumentalities can be used to form corrugations 10 on a variety of different holder blanks, i.e., regardless of the nominal diameter of the pipe which is to be clamped by the improved device. Each corrugation 10 has a substantially V-shaped outline and, as mentioned above, the apices of the two corrugations are spaced apart from one another by a distance which is less than the outer diameter of the pipe 8 when the end portions 6 are properly coupled to the respective legs 7.

The tools which are used to provide the end portions 6 of the holder 1 with slits 12 are preferably the same tools which are used to provide the end portions 6 with pairs of openings 13. This contributes to lower cost of the holder 1. The openings 13 in each of the end portions 6 preferably form a row which is parallel with the axis of the pipe 8, and this also applies for the projections 15 on the legs 7 of the confining member 2. The slits 12 and the openings 13 can be formed by one and the same tool or by one and the same set of tools, regardless of the length of the web 14 and regardless of the diameter of the pipe 8 which is to be confined in the space between the web 14 and the intermediate portion 3 of the fully assembled clamp. It goes without saying that the distance between the two outermost slits in each of the legs 7 at most equals but is preferably slightly less than the distance between the slits 12 in an end portion 6; this ensures that the projections 15 can be properly guided during travel along the outer sides of the respective ramps 11 on their way toward and into the respective openings 13. Once the projections 15 move into register with the respective openings 13, the intermediate portion 3 of the holder 1 is free to dissipate energy and to force the end portions 6 to move apart so that the projections 15 snap into the registering openings 13 to thus complete the coupling operation. Otherwise stated, the distance between the legs 7 is somewhat less than the distance between the ramps 11 in unstressed condition of the holder 1 so that it is necessary to move the legs 7 apart and/or to move the end portions 6 nearer to each other preparatory to attachment of the confining member 2 to the holder 1.

The dimensions of the clamp which is shown in FIG. 1 can correspond to the dimensions of a clamp as actually used to support and confine a pipe in the plumbing of a building or a conduit for electrical conductors or the like. Attachment of the confining member 2 to the holder 1 begins by inserting the projections 15 of one leg 7 into the corresponding openings 13 in a manner as shown in FIG. 4, and the right-hand end portion 6 is thereupon forcibly moved toward the other end portion 6 so as to ensure that the right-hand projections 15 can slide (note the arrow 16) along the right-hand ramp 11 and toward and into the respective pair of openings 13. This completes the attachment of the confining member 2 to the holder 1 because the innate resiliency of the holder suffices to hold the parts in the positions shown in FIG. 1. It is clear that the holder 1 is placed around the pipe 1 before the confining member 2 is affixed thereto. The arrangement is preferably such that the outer sides of the end portions 6 actually bear against the inner sides of the respective legs 7 in fully assembled condition of the clamp.

In order to disengage the confining member 2 from the holder 1, it is necessary to manually or otherwise force one of the end portions 6 toward the other end portion 6 so as to move the respective openings 13 away from the registering projections 15. The operator is then free to completely detach the confining member 2 from the holder 1. Separation of the confining member 2 from the holder 1 can be facilitated by using a screwdriver or any other rudimentary tool.

The holder 1 preferably comprises two halves which are mirror symmetrical to each other with reference to a plane 17 (shown in FIG. 1 by phantom lines) which includes the axis of the pipe 8. The same holds true for the confining member 2. Such design of the clamp is desirable and advantageous because the confining member 2 can be attached to or separated from the holder 1 regardless of whether the person in charge begins at the left-hand side or at the right-hand side of the symmetry plane 17.

Those portions of the corrugations 10 which are first contacted by the pipe 8 during insertion into the holder 1 preferably make with the plane 17 an acute angle of approximately 60 degrees. Such inclination of the just discussed portions of the corrugations 10 renders it possible to spread the holder 1 apart in response to the application of a relatively small force in order to move the pipe 8 to or from the position which is shown in FIG. 1 by moving the pipe relative to the holder and/or vice versa.

FIG. 1 shows that the confining member 2 is disposed at a level above the holder 1, i.e., the pipe 8 actually rests on the concave internal surface of the intermediate portion 3. However, it is equally possible to change the orientation of the improved clamp so that the holder 1 is disposed at a level above the confining member 2 or that the legs 7 of the confining member 2 in fully assembled condition of the clamp are substantially horizontal. This depends on the nature of the support (such as the foot 4 of FIG. 4) as well as on the location of the means for carrying the clamp and its support. For example, the holder 1 will be located at a level above the confining member 2 if the foot 4 of FIG. 4 is to be affixed to a ceiling or to an overhead beam. The force with which the intermediate portion 3 of the holder 1 resists expulsion of the projections 15 from the respective openings 13 in the end portions 6 can be readily selected in such a way that the confining member 2 cannot be detached from the holder 1 under the weight of the pipe 8 even if the clamp of FIG. 1 is turned upside down. The holder 1 can be placed around a pipe 8 before the foot 4 is affixed to a carrier, or the holder can be affixed to its carrier prior to insertion of the pipe thereinto.

It is often desirable to mount the improved clamp in suspended position, i.e., with the holder 1 at a level above the confining member 2. The pipe 8 in the space between the parts 1 and 2 then rests on the adjacent portions of the corrugations 10 and biases the end portions 6 of the holder 1 away from each other, i.e., into abutment with the inner sides of the respective legs 7, so that the confining member 2 is even less likely to be accidentally detached from the holder 1 in spite of the fact that it is located at a level below the holder. Those portions of the corrugations 10 which are immediately or closely adjacent the pipe 8 when the latter is properly inserted into the holder 1 preferably make with the plane 17 an acute angle of approximately 30 degrees. Such inclination of the portions of corrugations 10 which are adjacent the ends 9 of the intermediate portion 3 ensures that a pipe 8 which rests on the corrugations 10 when the holder 1 is located at a level above the confining member 2 will urge the end portions 6 apart with a substantial force which suffices to prevent unintentional separation of the confining member 2. In this manner, the weight of the confined pipe 8 actually contributes to more reliable engagement of cooperating male and female detent means on the legs 7 and end portions 6.

An important advantage of the improved clamp is that it need not comprise any threaded parts and also that its two components (1 and 2) can be mass-produced in available stamping, bending and like machines at a low cost. Moreover, and as explained above, the tools which are used to make the slits in the legs 7 and the slits 12 and openings 13 in the end portions 6 can be used in connection with the making of larger or smaller clamps. The same holds true for the tools which are used to form the corrugations 10. The making of corrugations 10 wherein the two portions of each corrugation make an angle of 90 degrees, and the making of confining members 2 wherein the legs 7 extend at right angles to the respective webs 14, also contribute to lower cost of the clamps.

The blanks of which the holder 1 and the confining member 2 are made can constitute simple strips or bands of sheet metal which are cut to size and thereupon punched, stamped and bent so as to form the legs 7 and the lugs 15 of the confining member 2 as well as the arcuate intermediate portion 3 and the corrugations 10, slits 12, openings 13 and ramps 11 of the end portions 6. The forces which must be applied in order to convert straight or convoluted strips of sheet metal into confining members and holders are small. This applies not only for the making of the legs 7 and for bending of the intermediate portion 3 to impart thereto the desired arcuate shape but also for the rather simple ramps 11 which are designed to guide the respective projections 15 along straight paths on their way toward and into the corresponding openings 13. The openings 13 are preferably disposed between the respective slits 12; this reduces the resistance of the innermost portions of the ramps 11 to bending because their connections with the main parts of the respective end portions 6 are relatively narrow.

The feature that the end portions 6 of the holder 1 are or can be straight at the time the corrugations 10 are formed therein renders it possible to use one and the same set of corrugating tools for the making of corrugations in holders which are intended to form components of clamps for large-, medium- or small-diameter pipes. The resistance of the holder 1 to deformation can suffice to ensure that a pipe 8 which is forced into a position immediately adjacent the concave side of the intermediate portion 3 will be held in suspended position by resting on the corrugations 10 before the confining member 2 is attached to the end portions 6 and after the support 4 for the holder 1 is already secured to an overhead beam or the like. As mentioned above, the thus mounted holder 1 is thereupon continuously acted upon by the pipe 8 which rests on the corrugations 10 and urges the end portions 6 away from each other and into desirable pronounced engagement with the respective legs 7. The heavier the pipe the more reliable is the retention of projections 15 in the respective openings 13. Once the confining member 2 is detached from the end portions 6, the pipe 8 can be pulled away from the intermediate portion 3 of the holder 1 to bear upon the adjacent sloping portions of the corrugations 10 and to move the end portions 6 apart so as to allow for separation of the pipe from the holder.

Figure 5:
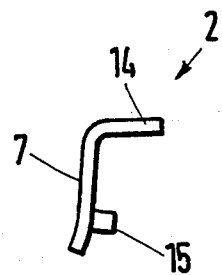
FIG. 5 is a fragmentary elevational view of a modified confining member.

FIG. 5 shows a portion of a modified confining member 2 wherein the tip or terminal of the leg 7 is bent slightly outwardly away from the other leg (not shown). This results in the making of a ramp or cam face which facilitates attachment of the confining member to the holder.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A clamp for pipes having a predetermined outer diameter, comprising a substantially C-shaped resilient holder including an arcuate intermediate portion and first and second end portions; and a substantially U-shaped confining member separably attached to said holder and including a web and first and second legs flanking said web, said first and second legs being outwardly adjacent said first and second end portions, respectively, and said legs and the respective end portions having cooperating male and female detent means, said intermediate portion storing energy in a sense to move said end portions apart so that said end portions are biased toward the respective legs to maintain the male detent means in engagement with the respective female detent means, and said confining member and said holder defining a space such that a pipe having said predetermined diameter is receivable therein with at least some radial play, said legs having projections which extend toward the respective end portions and constitute said male detent means, and said end portions having recesses constituting said female detent means and receiving the respective projections, said end portions also having sloping ramps along which the respective projections are slidable on their way toward penetration into the respective recesses, and each of said end portions further having guide means flanking the respective ramp and arranged to guide the projections on their way toward and into the respective recesses during attachment of the confining member to said holder.

2. The clamp of claim 1, wherein said holder and said confining member consists of a metallic sheet material, said projections including lugs provided on and forming integral parts of said legs.

3. The clamp of claim 1, wherein each of said end portions has two open-ended slits extending in the circumferential direction of said holder and said ramps are disposed between the slits of the respective end portions.

4. The clamp of claim 3, wherein said ramps constitute inwardly bent parts of the respective end portions and the slits in each of said end portions are substantially parallel to each other.

5. The clamp of claim 3, wherein said recesses are holes extending through the respective end portions and communicating with the corresponding slits.

6. A clamp for pipes having a predetermined outer diameter, comprising a substantially C-shaped resilient holder including an arcuate intermediate portion and first and second end portions; and a substantially U-shaped confining member separably attached to said holder and including a web and first and second legs flanking said web, said first and second legs being outwardly adjacent said first and second end portions, respectively, and said legs and the respective end portions having cooperating male and female detent means, said intermediate portion storing energy in a sense to move said end portions apart so that said end portions are biased toward the respective legs to maintain the male detent means in engagement with the respective female detent means, and said confining member and said holder defining a space such that a pipe having said predetermined diameter is receivable therein with at least some radial play, said legs having end faces and slits extending to said end faces, and said male detent means including bent-over lug-shaped portions of said legs, each of said lug-shaped portions being flanked by two slits in the respective leg.

7. The clamp of claim 6, wherein said holder extends along an arc of more than 180 degrees.

8. The clamp of claim 6, wherein said end portions having recesses constituting said female detent means and receiving the respective lug shaped portions.

9. The clamp of claim 8, wherein each of said legs has a plurality of lug shaped portions.

10. The clamp of claim 8, wherein said end portions have sloping ramps along which the respective lug shaped portions slidable on their way toward penetration into the respective recesses.

11. The clamp of claim 8, wherein said recesses are holes extending through the respective end portions.

12. The clamp of claim 1, wherein each of said end portions has an inwardly extending corrugation adjacent the respective leg, said corrugations being spaced apart from one another by a distance at least slightly less than said predetermined diameter.

13. The clamp of claim 12, wherein said intermediate portion extends along an arc of at least 180°.

14. The clamp of claim 13, wherein said intermediate portion has ends which are adjacent the respective corrugations and are spaced apart from one another by a distance exceeding said predetermined diameter.

15. The clamp of claim 6, wherein said web is straight.

16. The clamp of claim 6, wherein said legs have terminal portions which extend beyond the respective lug shaped portions slope outwardly away from each other.

17. The clamp of claim 6, wherein at least said holder consists of spring steel.

18. The clamp of claim 6, further comprising at least one support affixed to said intermediate portion.

19. The clamp of claim 6, wherein said holder and said confining member each comprise two mirror symmetrical halves.

* * * * *